J. M. YOUNG.
ART OF PRESERVING FOOD PRODUCTS AND APPARATUS THEREFOR.
APPLICATION FILED OCT. 21, 1914.
1,168,695.
Patented Jan. 18, 1916.
2 SHEETS—SHEET 1.
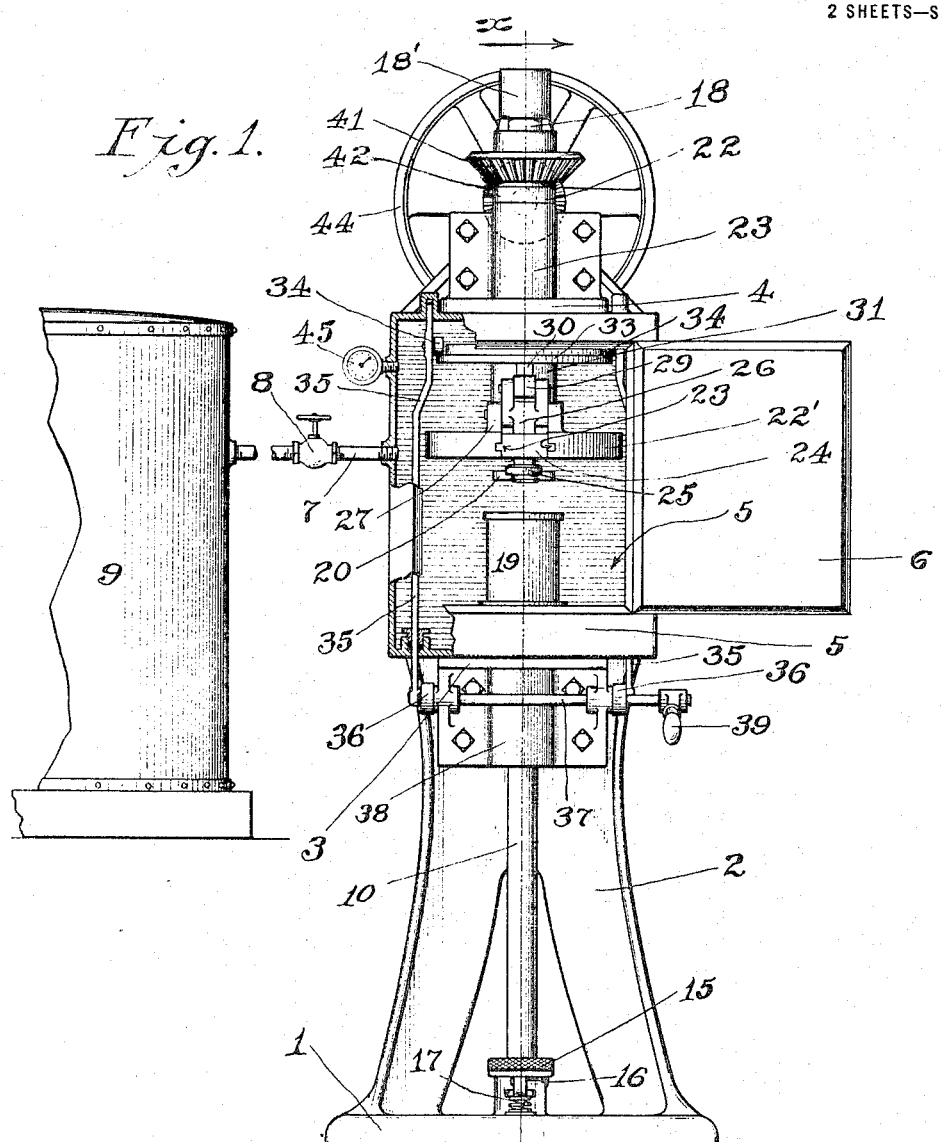
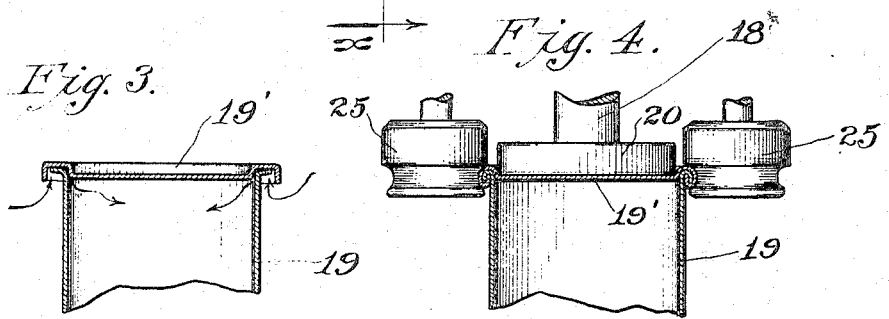

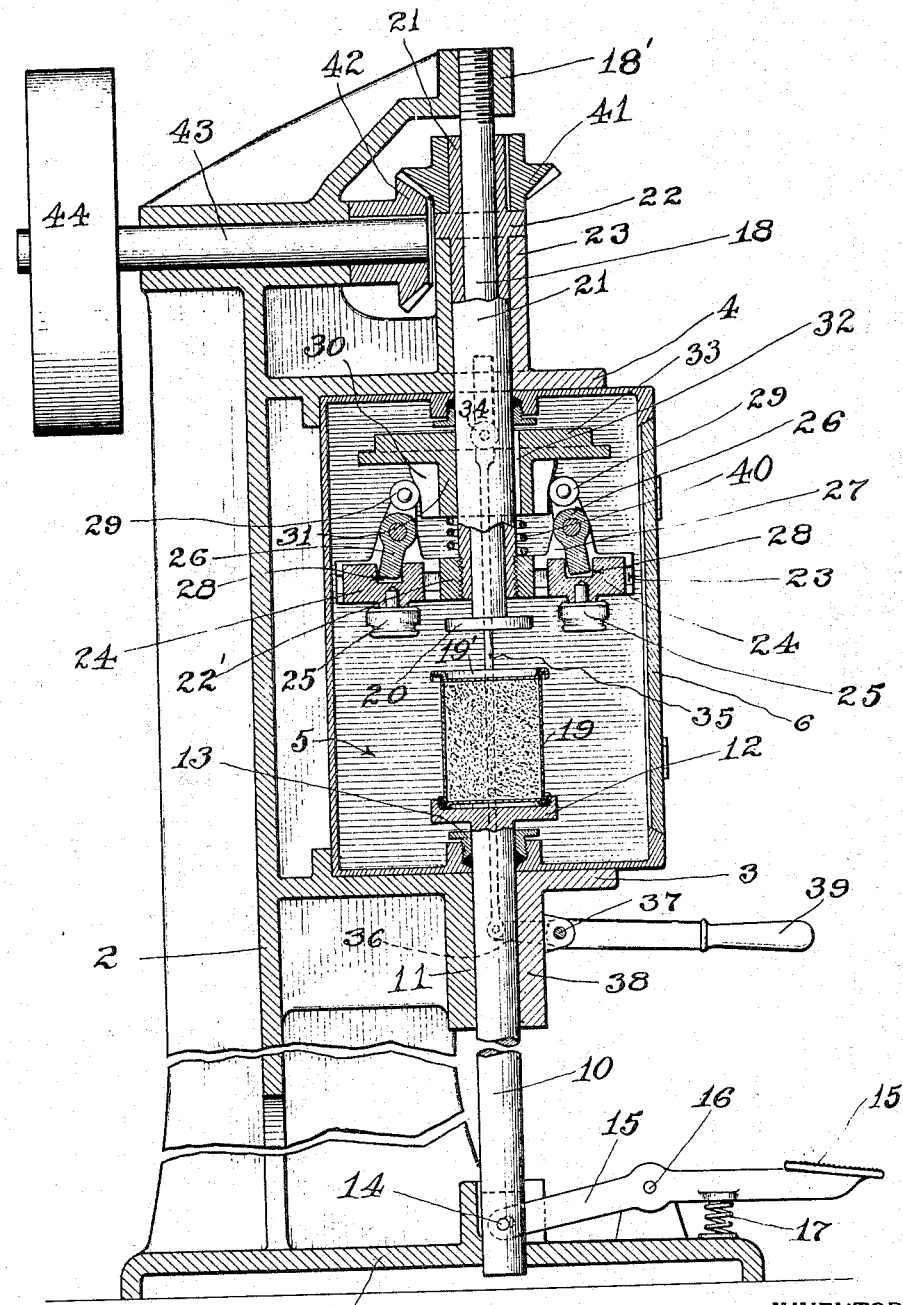

UNITED STATES PATENT OFFICE.

JOHN M. YOUNG, OF SAN FRANCISCO, CALIFORNIA, ASSIGNOR TO AMERICAN CAN COMPANY, OF SAN FRANCISCO, CALIFORNIA, A CORPORATION OF NEW JERSEY.

ART OF PRESERVING FOOD PRODUCTS AND APPARATUS THEREFOR.

1,168,695.  Specification of Letters Patent.  Patented Jan. 18, 1916.

Application filed October 21, 1914.  Serial No. 867,785.

*To all whom it may concern:*

Be it known that I, JOHN MARSHALL YOUNG, a citizen of the United States, residing in the city and county of San Francisco and State of California, have invented certain new and useful Improvements in the Art of Preserving Food Products and Apparatus Therefor, of which the following is a specification.

At present certain food products are preserved for use in receptacles in which there is formed a vacuum, but this preservation of foods, such as coffee, has not proven entirely satisfactory, as coffee preserved in a vacuum will, in a short time, owing to the oil therein, ferment and generate a gas within the container which gas contains all of the desirable qualities of the bean, and consequently when the receptacle is opened and the gases escape, the quality and flavor of the coffee is lost.

The hereinafter described invention relates to an improvement in the art of preserving food products and to apparatus therefor, and has for its object to prevent the deterioration of that class of food products which at the present time are placed on the market in sealed containers, which object is accomplished by providing means whereby coffee or other articles of food products may be packed in sealed metallic containers wherein, prior to the sealing or closing of the receptacle, the same is charged with a suitable air, inert or dead gas, such as nitrogen or carbondioxid, for preventing the fermentation of the food product or generation of a gas from the ingredients of the food product, such gas or preserving medium being forced into the container while the end or cover thereof is loosely applied thereto, the end or cover after the charging of the container with the preserving medium being hermetically sealed by permanently uniting the said end or cover to the container.

The improvement in the art therefore consists in charging a filled container, having an end or cover loosely applied thereto, with a suitable preserving medium, and thence permanently uniting the loosely applied cover to the body of the filled container.

The mechanism for the carrying out of the invention comprises a receptacle capable of being closed and in which the filled container with an end or cover loosely applied thereto is placed or delivered, with means associated therewith for charging the filled container with a preserving medium which is preferably forced therein by being delivered into the receptacle under pressure, with means located within the receptacle for hermetically sealing the charged container by permanently uniting the loosely applied cover to the body of the filled and charged container.

To comprehend the invention, and more particularly the apparatus for the carrying out of the same, reference should be had to the accompanying sheets of drawings, wherein—

Figure 1 is a view in elevation of my invention, disclosing a container with a cover positioned thereon, and the container positioned within the receptacle, and disclosing the double seaming rolls in elevated position. Fig. 2 is a vertical sectional view taken on line $x$—$x$ of Fig. 1, disclosing the means for raising the container in contact with the presser foot, the double seaming rollers, and the means for operating the same. Fig. 3 is a view in detail of a container with a cover loosely positioned thereon, and as positioned in the receptacle, the arrows indicating the course taken by the preserving gases in entering the container from the receptacle. Fig. 4 is a view in detail of the double seaming rolls, double seaming the cover to the container body.

Referring more particularly to the several views of the drawings, wherein like characters of reference designate corresponding parts, the numeral 1 indicates a suitable base from which extends a standard 2 formed intermediate its length with spaced horizontally disposed laterally extending supports 3 and 4, between which is positioned a suitable receptacle 5 having a door or closure 6, whereby access may be had to the interior thereof.

A suitable feed pipe 7 controlled by a valve 8 communicates at one end with the interior of the receptacle 5 and connects at its opposite end with a suitable reservoir 9 adapted to contain carbondioxid, nitrogen or other inert or dead gas under pressure.

Extending upwardly, preferably through the center of the lower wall of the receptacle 5, is a slidably mounted shaft 10 which operates in a guide 11 fixed in the support 3, and is provided at its upper end with a suitable can or container seat 12 and adapted to receive the filled cans. A gland 13 surrounds the shaft 10 at its point of entrance into the receptacle to prevent leakage therearound, and the lower end of the shaft 10 is pivotally connected, as at 14, to one end of a foot pedal 15 pivotally mounted, as at 16, to the base plate and normally maintained in a raised position at its outer end by the coiled spring 17.

A shaft 18 carried by an arm 18' extends through the support 4 into the upper portion of the receptacle 5 and carries on its lower end a suitable presser foot 20 which rests on the can cover 19' and retains the same in position on the can 19 when the can is in its raised position through the action of the foot pedal 15.

A rotatable shaft 21 formed with a bearing flange 22 which rests on a collar 23 on the support 4, surrounds the shaft 18, and projects at its lower end into the receptacle 5 to within a short distance of the presser foot 20. Thereaded on the lower end of the shaft 21 is a supporting disk 22' formed at opposite sides with grooved recesses or guides 23 in which are slidably mounted the tongued blocks 24 carrying on their under surface the rotatable seaming rolls 25 of the usual construction. Suitable levers 26 pivoted to brackets 27 on either side of the guides 23 project at their lower ends in recesses 28 in the blocks 24, and carry at their upper ends the anti-friction rollers 29 which coöperate with the vertically disposed cam surfaces 30 formed on the collar 31. The collar is slidable vertically on the key 32 carried by the shaft 21, and said key causes the collar to rotate with the shaft. A flange disk 33 is carried by the upper portion of the collar 31 and coöperating with the upper surface thereof are the rollers 34 carried by the upper end of connecting rods 35, pivotally joined at their lower ends to arms 36 carried by a rotatably mounted shaft 37, carried by a plate 38, and provided with a hand operating lever 39. A coiled spring 40 surrounds the shaft 21 and is interposed between the collar 31 and the disk 22', and normally maintains the collar 31 in its elevated position.

A bevel gear 41 is keyed to the shaft 21 above the flange 22 and intermeshes with a corresponding gear 42 carried by a rotary power shaft 43 carrying a belt wheel 44 which is adapted to receive power from any suitable source. A suitable gage 45 communicates with the interior of the receptacle 5 and indicates the pressure therein.

In operation a filled can 19 with its cover 19' loosely applied thereto is positioned within the container 5 on the seat 12. After the door 6 has been closed, the valve 8 is opened, which permits the inert or dead gas in the reservoir 9 to flow into the container 5, and as the pressure within the receptacle increases, to pass into the interior of the can between the loosely applied cover 19' and can 19 thereof.

It will be understood that the cover 19' is loosely applied to the can 19, but by the expression "loosely applied" is to be understood that the said cover is so placed or positioned relative to the open end of the can 19 as to permit the free ingress of the preserving medium for the purpose of charging the filled container, and for this purpose the end or cover may, if so desired, be partly united to the open end of the container by having the flange of the can end or cover partly clenched to the end of the container at points around the periphery thereof. After the contents of the container have been subjected to gas of a sufficient pressure, and the container is charged with gas, the valve 8 is closed and the operator depresses the foot pedal 15, which causes the can to be raised, and the cover 19' thereof to contact with the presser foot 20, which temporarily retains the head tightly on the can. The hand lever 39 is now operated to depress the collar 31 against the action of the spring 40 and which causes the cams 30 to force the double seaming rolls 25 inwardly to engage the joint between the can cover and body, and the rotation of the shaft 21 carrying the double seaming rolls will cause the double seaming rolls to double seam the can cover and body together. After the cover is secured to the can body, pressure may be released on the lever 39, and foot pedal 15, which will permit the can with its attached cover to assume the position as in Fig. 1, at which time the door 6 may be opened and the can removed therefrom.

By the hereinbefore described invention—food products may be packaged and preserved in cans or containers under pressure of a suitable preserving gas, and while the cans or containers are positioned within a closed receptacle containing the preserving gas.

Having thus described my invention what I claim as new and desire to protect by Letters Patent is:—

1. The means for preserving food products, the same comprising a receptacle for receiving a filled container with a cover loosely applied thereto, devices for charging the container with a preserving medium, and mechanism within the receptacle for hermetically sealing the charged container by permanently uniting the cover thereto.

2. An apparatus for preserving food products, the same comprising a receptacle for receiving a filled container having a cover loosely applied thereto, means for delivering a preserving medium into the receptacle for charging the container held therein, and mechanism within the receptacle for hermetically sealing the charged container by double seaming the flange of the cover thereto.

3. An apparatus for preserving food products, comprising a normally closed receptacle for receiving a filled can or container with a cover loosely applied thereto, means for admitting a preserving medium under pressure into the said receptacle for charging the contents of the filled container therein, and means within the receptacle for hermetically securing the cover to the can or container while positioned within said receptacle.

4. An apparatus for preserving food products, comprising a normally closed receptacle for receiving a filled can or container with a cover loosely applied thereto, means for admitting a preserving gas under pressure into the receptacle for charging the filled can or container therein, means within the receptacle for hermetically sealing the cover to the filled can or container, and devices for positioning the charged container and cover closing means relative to each other.

5. An apparatus for preserving food products, comprising a normally closed receptacle for receiving a filled can with a cover loosely applied thereto, means for admitting a preserving gas under pressure into the said receptacle for charging the filled can or container therein, and mechanism within the receptacle for double seaming the can cover to the filled can.

6. An apparatus for preserving food products, comprising a normally closed receptacle for receiving a filled can with a cover loosely applied thereto, means for admitting a preserving gas under pressure into the said receptacle for charging the filled can or container therein, means for double seaming the cover to the can body while in said receptacle, and means for positioning the double seaming means and the can body into coöperative relation relative to each other.

7. An apparatus for preserving food products, comprising a normally closed receptacle, a movable seat within said receptacle for receiving a can with a cover loosely applied thereto, means for admitting a preserving gas under pressure into said receptacle for charging the filled can or container therein, means within the receptacle for double seaming the cover to the can body, and means for operating the said can seat for positioning the can cover into operative relation with the double seaming means.

8. An apparatus for preserving food products, comprising a normally closed receptacle for receiving a can with a cover loosely applied thereto, means for admitting a charge of preserving gas under pressure into said receptacle for charging a filled can or container positioned therein, means within the receptacle for double seaming the cover to the can, and means for holding the cover in position on the can while the same is being double seamed thereto.

9. An apparatus for preserving food products, comprising a receptacle formed with an opening and adapted for receiving a filled can with a cover loosely applied thereto, a closure for the opening in said receptacle, valve controlled means for admitting a charge of preserving gas under pressure into said receptacle for charging the filled can or container therein, and associated instrumentalities for temporarily retaining the cover on the can and for double seaming the cover to the can while temporarily retained thereon.

10. An improvement in the art of preserving food products, consisting in delivering a filled container with a cover loosely applied thereto within a receptacle, charging the filled container with a preserving medium, and hermetically sealing the charged container while within the receptacle by permanently uniting the cover thereto.

11. An improvement in the art of preserving food products which consists in charging a filled container having a cover loosely applied thereto with a preserving medium, and thence hermetically sealing the charged container before an appreciable escape of the preserving medium by permanently uniting the cover to the said container.

12. An improvement in the art of preserving food products which consists in delivering a filled container with a cover loosely applied thereto into a normally closed receptacle, charging the container by admitting a preserving medium into the receptacle, and hermetically sealing the charged container while within the said receptacle by permanently uniting the cover thereto.

In testimony whereof I have signed my name to this specification in the presence of two subscribing witnesses.

JOHN M. YOUNG.

Witnesses:
 HARRY H. TOTTEN,
 D. B. RICHARDS.